(12) United States Patent
Pelly (10) Patent No.: US 6,690,230 B2
(45) Date of Patent: Feb. 10, 2004

(54) ACTIVE COMMON MODE FILTER CONNECTED IN A-C LINE

(75) Inventor: Brian Pelly, Palos Verdes Estates, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 10/146,334

(22) Filed: May 15, 2002

(65) Prior Publication Data

US 2002/0171473 A1 Nov. 21, 2002

Related U.S. Application Data (60) Provisional application No. 60/291,676, filed on May 17, 2001.

(51) Int. Cl.[7] .................................................. H03B 1/00
(52) U.S. Cl. ........................................ 327/552; 327/100
(58) Field of Search ................................ 327/552, 100, 327/103, 104, 108, 112, 343, 372, 423, 424, 434, 436, 447, 448, 494, 508; 363/13, 16, 17, 34–37, 40, 41, 44, 55, 56.01, 56.02

(56) References Cited

U.S. PATENT DOCUMENTS

| 4,159,499 A | 6/1979 | Bereskin ..................... 361/42 |
| 4,351,022 A | 9/1982 | Lovelace et al. ............. 363/87 |

(List continued on next page.)

FOREIGN PATENT DOCUMENTS

| EP | 0780960 | 6/1997 |
| EP | 0809346 | 11/1997 |
| EP | 0921626 | 9/1999 |
| JP | 9266677 | 10/1997 |
| JP | 11162686 | 6/1999 |
| JP | 11178327 | 7/1999 |
| JP | 2000-32743 | 1/2000 |

OTHER PUBLICATIONS

IBM Technical Disclosure Bulletin, "Improved Common Mode Choke" Jun. 1989, pp. 99–100.

(List continued on next page.)

*Primary Examiner*—Timothy P. Callahan
*Assistant Examiner*—Linh Nguyen
(74) *Attorney, Agent, or Firm*—Ostrolenk, Faber, Gerb & Soffen, LLP (57) ABSTRACT

An active filter for reducing common mode current in a pulse width modulating driving circuit for driving a load from a-c lines of an a-c source, wherein the driving circuit includes a rectifier connectable to the a-c lines and producing a rectified output voltage connected to a d-c bus, a PWM inverter having input terminals connected to the d-c bus and having a controlled a-c output for driving the load, the active filter comprising a current sensor for sensing the common mode current in the driving circuit, an active filter circuit comprising first and second transistors, each having first and second main electrodes and a control electrode, the transistors being coupled in a series circuit to feed an output node, the transistors being controlled such that they are alternately switched between a non-conducting state and a conducting state in a linear region by control of their control electrodes, their control electrodes being connected to an output from the current sensor, a output node between the transistors being coupled to an isolating capacitor, the isolating capacitor being coupled to a ground line coupled to the load, the two transistors providing alternate paths for current in the ground line to flow to respective ones of the a-c lines of the a-c source thereby to reduce the ground current flowing in the ground line by providing a circulating path for the current in the ground line, the active filter circuit being connected in the a-c lines coupled to the pulse width modulated driving circuit.

19 Claims, 6 Drawing Sheets

U.S. PATENT DOCUMENTS

| | | | |
|---|---|---|---|
| 4,709,233 A | | 11/1987 | Duval .................... 340/825.57 |
| 4,833,377 A | | 5/1989 | Volk, Sr. et al. ............. 318/747 |
| 4,849,950 A | | 7/1989 | Sugiura et al. ................ 363/48 |
| 4,888,675 A | | 12/1989 | Kumar et al. .................. 363/47 |
| 4,920,475 A | * | 4/1990 | Rippel ......................... 363/132 |
| 5,179,362 A | | 1/1993 | Okochi et al. ............... 333/181 |
| 5,218,520 A | * | 6/1993 | Rozman et al. ................ 363/39 |
| 5,343,079 A | * | 8/1994 | Mohan et al. ................ 307/105 |
| 5,574,398 A | | 11/1996 | Hagino et al. ............... 327/557 |
| 5,630,220 A | | 5/1997 | Yano ........................ 455/234.1 |
| 5,661,390 A | * | 8/1997 | Lipo et al. ................... 318/803 |
| 5,672,102 A | | 9/1997 | Herald ......................... 454/184 |
| 5,748,459 A | | 5/1998 | Yamada et al. ................ 363/21 |
| 5,831,842 A | | 11/1998 | Ogasawara et al. ............ 363/40 |
| 5,905,642 A | | 5/1999 | Hammond .................... 363/37 |
| 5,936,856 A | | 8/1999 | Xiang .......................... 363/98 |
| 5,982,106 A | | 11/1999 | Bobel ..................... 315/209 R |
| 6,011,707 A | | 1/2000 | Mine ........................... 363/89 |
| 6,057,723 A | | 5/2000 | Yamaji et al. ............... 327/237 |
| 6,151,228 A | | 11/2000 | Miyazaki et al. ............. 363/48 |
| 6,297,971 B1 | * | 10/2001 | Meiners ........................ 363/36 |
| 6,414,857 B2 | * | 7/2002 | Motoori ........................ 363/41 |
| 6,424,207 B1 | * | 7/2002 | Johnson ...................... 327/552 |
| 2001/0048310 A1 | | 12/2001 | Takahashi ................... 324/551 |

OTHER PUBLICATIONS

Ogasawara, S. Akagh, H., "Modeling and Damping of High–Frequncy Leakage Current PWM Inverter–Fed AC Motor Drive Systems", IEEE Trans. Ind. Applicat., vol. 32 Issue: 5 Sep./Oct. 1996 [Abstract] Full Text pp. 1105–1113.

IBM Technical Disclosure Bulletin, "Latch Circuit" Aug. 1962 p. 47.

IBM Technical Disclosure Bulletin, "Analysis of Current–Injected Controlled Multi–Output Switching Converters" Aug. 1990, pp. 58–61.

IBM Technical Disclosure Bulletin, "Differential Current Sensing Sysem For Diagnostic Purposes" Jan. 1981, pp. 3660–3662.

Patent Abstracts of Japan "Ratio Differential Relay Device" Appln. No. 52121125.

* cited by examiner

ACTIVE COMMON MODE FILTER CONNECTED IN A-C LINE

CROSS REFERENCE TO RELATED APPLICATION

This application claims the benefit and priority of U.S. Provisional Application Serial No. 60/291,676 filed May 17, 2001 entitled "Active Common Mode Filter Connected In A-C Line", the entire disclosure of which is hereby incorporated by reference. This application is also related to the subject matter of U.S. application Ser. No. 09/816,590 filed Mar. 23, 2001 entitled "Active Filter For Reduction of Common Mode Current", the entire disclosure of which is hereby incorporated by reference.

BACKGROUND OF THE INVENTION

An active common mode filter for a PWM inverter is known and is described in detail in application Ser. No. 09/816,590, referred to above. The active common mode filter of the above application includes an amplifier and current driver circuit located in the d-c link between the rectifier and the inverter of a pulse width modulated driving circuit.

Figure 1:
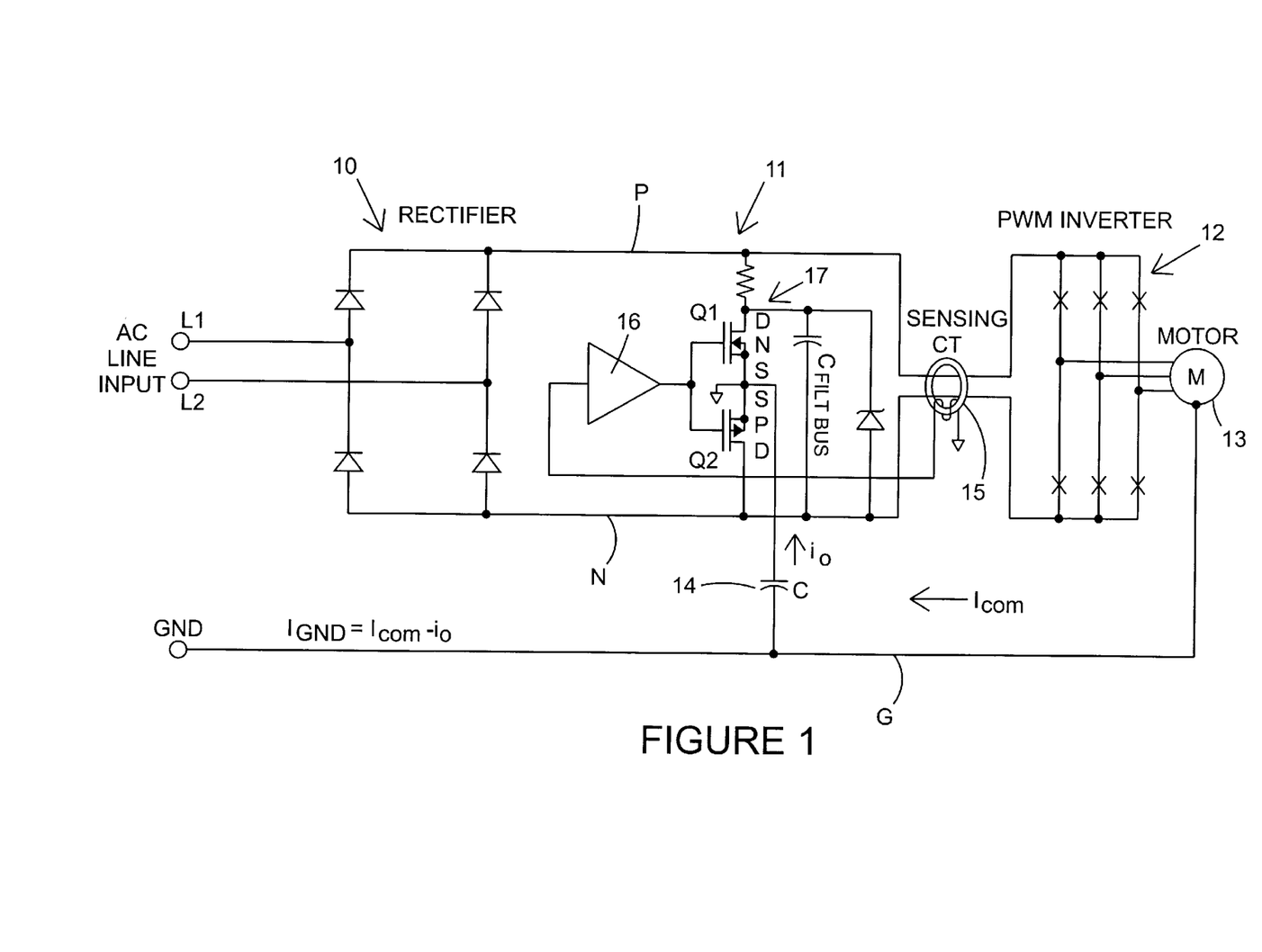
FIG. 1 is a circuit diagram showing the active mode filter in the d-c link of a PWM driving circuit.

For that filter, as shown in FIG. 1, an a-c line input having terminals $L_1$, $L_2$ (for a single phase) and ground (GND) is connected to a full wave bridge connected rectifier 10 which is coupled by a d-c link P, N to a 3 phase PWM inverter 12 (which may employ thyristors or IGBTs in each leg, with suitable controls, not shown). Invertor 12 then drives the a-c motor 13. The grounded case of motor 13 is connected to GND and to coupling capacitor 14. An active filter 11 includes a ground current sense transformer 15 which produces an output to op-amp 16. This, in turn, controls the gates of transistors $Q_1$ and $Q_2$ of current driver circuit 17 coupled across the d-c link to switch the transistors between a non-conducting state and a conducting state in a linear region.

Amplifier 16 receives an input from a secondary of the current transformer 15, which has two primary coils coupled in the two legs of the d-c link. The current transformer provides an output on its secondary proportional to the common mode current which equals the leakage or noise current in the ground line G from the motor. This noise current is generated across the internal capacitance between the motor windings and the motor case, and flows in the ground line G. This noise current can be substantial and can also generate significant EMI.

The circuit of FIG. 1 is designed to cancel the noise current by replicating the current through the isolating capacitor 14, allowing the current to travel back to the buses of the d-c link. This substantially eliminates the ground current on the GND line back to the a-c network and therefore the common mode noise current present on the a-c network. Thus, the filter 11 reproduces the common mode current that flows from the d-c link into the inverter, creating circulating paths for the common mode current via the ground wire from the motor, the coupling capacitor 14 and back to the d-c link, bypassing the common mode current from the a-c input lines.

The circuit in FIG. 1 may not always be practically convenient, because it involves "breaking into" the d-c link to insert the active filter 11 and the current sensing transformer 15.

In some applications, it would be preferable to insert the common mode filter 11 in the input a-c line that feeds the rectifier 10 of the PWM driving circuit. This would conform to the usual connection point of a normal passive common mode filter, which is commonly connected in the a-c line. If the active common mode filter could also be placed in the a-c line, it would be a direct substitute for the normal passive common mode filter, and would not require modifying the PWM drive itself.

SUMMARY OF THE INVENTION

It is accordingly an object of the present invention to provide an active common mode filter which can be constructed as a form of a-c filter which can be added on to an inverter without modifying the inverter circuit.

It is further an object of the invention to provide such an active common mode filter which can be utilized both in a feed forward or feed back architecture. In a traditional feed back architecture for a common mode filter circuit, the common mode noise is sensed after the cancellation point and the canceling signal is injected by an amplifier having high gain and fed back to the point of noise cancellation. In contrast, in a feed forward architecture, the common mode noise is sensed before the cancellation point and the canceling signal is injected by a gain of one amplifier and fed forward to the noise cancellation point.

It is still a further object of the invention to provide an active common mode filter circuit which does not require modification of a system into which it is connected.

It is yet still a further object of the present invention to provide an active common mode filter circuit which can directly replace a passive a-c line common mode filter.

The above and other objects of the present invention are achieved by an active filter for reducing common mode current in a pulse width modulated driving circuit for driving a load from a-c lines of an a-c source, wherein the driving circuit includes a rectifier connectable to the a-c lines and producing a rectified output voltage connected to a d-c bus, a PWM inverter having input terminals connected to the d-c bus and having a controlled a-c output for driving the load, the active filter comprising a current sensor for sensing the common mode current in the driving circuit, a current driver circuit comprising first and second transistors, each having first and second main electrodes and a control electrode, the transistors being coupled in a series circuit to feed a single output node between them, the transistors being controlled such that they are alternately switched on and off by control of their control electrodes, their control electrodes being connected to an output from the current sensor, the output node between the transistors being coupled to an isolating capacitor, the isolating capacitor being coupled to a ground line coupled to the load, the two transistors providing alternate paths for current in the ground line to flow to the a-c lines of the a-c source thereby to reduce the common mode current flowing from the a-c source by providing a circulating path for the current the active filter being connected in the a-c lines coupled to the pulse width modulated driving circuit.

The above and other objects are also achieved by an active filter for reducing common mode current in a driving circuit for driving a load from a-c lines of an a-c source, wherein the driving circuit provides a controlled a-c output for driving the load and the load has a ground line coupled to the a-c source, the active filter comprising a current sensor for sensing the common mode current in the driving circuit, an active filter circuit comprising a transistor current driver circuit controlled by the current sensor such that it provides a circulating path for a ground current in the ground line, the current driver circuit being coupled to an isolating capacitor, the isolating capacitor being coupled to the ground line coupled to the load, the current driver circuit enabling the current in the ground line to flow to respective ones of the a-c lines of the a-c source thereby to reduce the ground current flowing in the ground line, the active filter circuit being connected in the a-c lines coupled to the driving circuit.

Other features and advantages of the present invention will become apparent from the following description of the invention which refers to the accompanying drawings.

BRIEF DESCRIPTION OF THE DRAWING(S)

Throughout the drawings, like parts are designated by the same reference numbers.

DETAILED DESCRIPTION OF EMBODIMENTS OF THE INVENTION

Figure 2:
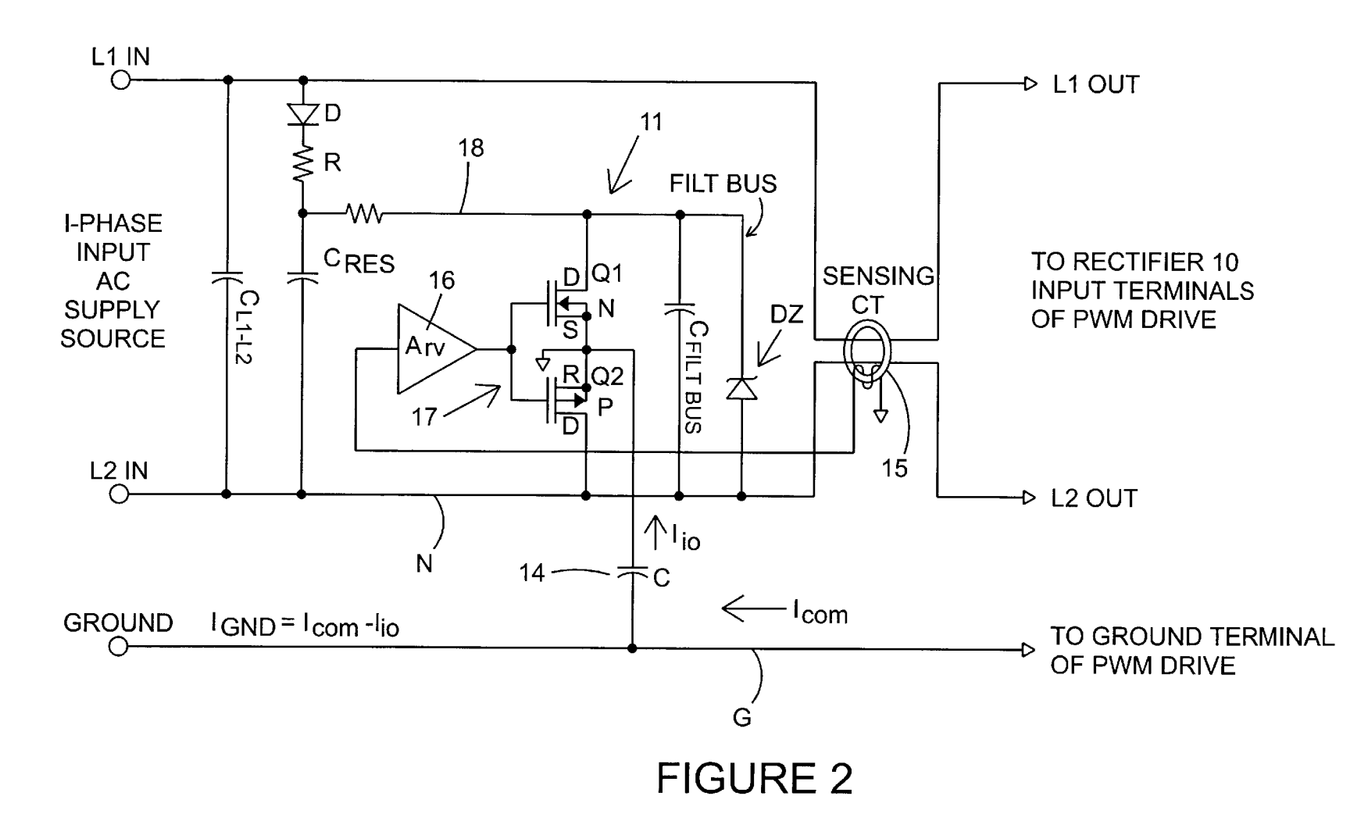
FIGS. 2 and 3 are circuit diagrams showing the active mode filter (in a feed forward architecture) in the a-c line input for a single phase and 3 phase input to a PWM driving circuit.

FIG. 2 shows the connection of the active filter directly in the a-c line, for a single phase input. Diode D and Capacitor $C_{RES}$ establish a d-c voltage, approximately equal to the peak line to line voltage, for the active filter 11. Resistor R limits the initial charging current of $C_{RES}$. Diode DZ regulates the d-c level on filter bus 18.

The current sensing transformer 15 acts as a differential current sensor, sensing the difference between the two currents flowing in the two legs L1 and L2 of the a-c line. Transformer 15 thus senses the common mode current flowing from $L1_{OUT}$ and $L2_{OUT}$ to the a-c input terminals of the PWM drive (and which also flows in the ground line G), and the amplifier 16 and MOSFETs Q1 and Q2 reproduce this current as the current $I_{io}$ in the ground coupling capacitor 14. This effectively cancels, or reduces the common mode current $I_{COM}$. $I_{GND}$ is the difference between $I_{COM}$ and $I_{io}$ that flows back to the a-c line. The level of $I_{GND}$ is thus reduced to near zero by the active filter.

When Q1 conducts the common mode current flowing from the ground wire of the PWM drive finds its way back to $L2_{OUT}$ via the capacitor 14, the drain of Q1 and $C_{FILT\ BUS}$, and to $L1_{OUT}$ via the drain of Q1, $C_{FILT\ BUS}$ and $C_{L1-L2}$. When Q2 conducts, the common mode current flowing from the ground wire of the PWM drive is returned to $L2_{OUT}$ via the capacitor 14, the drain of Q2 directly to $L2_{OUT}$, and to $L1_{OUT}$ via the drain of Q2 and $C_{L1-L2}$ to $L1_{OUT}$.

It should be noted that in connection with the description of FIG. 2 (as well as in connection with FIG. 1 and the other embodiments described below), it is assumed to simplify the description that the ground current that flows back from the load in the ground wire is equal to the common mode line current flowing in a-c input lines L1 and L2, and therefore that the supply line ground current is zero. In fact, there is an additional ground current component that commonly flows from the load into the ground itself via stray capacitance of the motor, cables, the motor drive, etc to the surrounding physical ground.

This additional component circulates back through the supply ground wire to capacitor 14 to satisfy the requirement that the sum of all the ground currents equals the common mode line current. Thus, it will be understood that while there can be current in the supply ground wire, the active common mode filter of this invention effectively maintains the common mode line current at the desired virtually zero-level.

Referring still to FIG. 2, a circulating path for the common mode current is thus created via the ground wire of the PWM drive, back to $L1_{OUT}$ and $L2_{OUT}$, eliminating common mode current from flowing into terminals $L1_{IN}$ and $L2_{IN}$ from the input a-c supply source.

The capacitor $C_{L1-L2}$ serves the dual purpose of providing filtering of normal mode (line to line) conducted EMI, and provides a low impedance path between $L1_{IN}$ and $L2_{IN}$ for returning common mode current that flows through the active filter to $L1_{OUT}$. The capacitor C FILT BUS also serves to return ground current to line L2 and further acts to smooth the d-c level on the filter bus 18.

Figure 3:
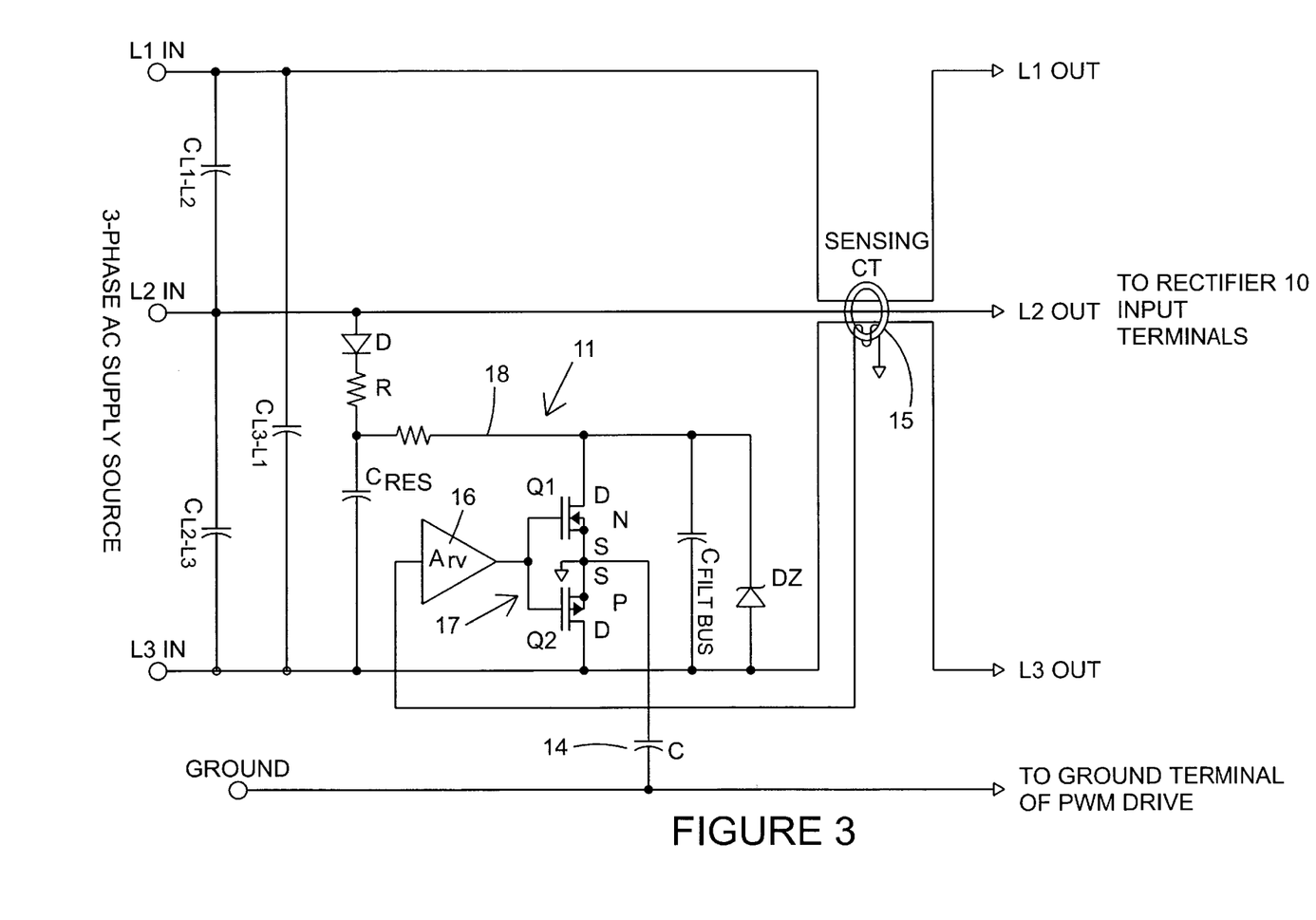

FIG. 3 shows an equivalent arrangement of the active filter of FIG. 2 for a three-phase input.

The common mode current sensing transformer 15 has three a-c lines $L1_{IN}$, $L2_{IN}$ and $L3_{IN}$ provided through the core of the transformer as the primaries for sensing the common mode current. The output of the secondary is provided to the amplifier 16 in the same fashion as in FIG. 2 and responds to any differences between the current flowing in the a-c lines. The circuit 11 operates in the same way as described with respect to FIG. 2. It is powered in the same way between two of the a-c lines, in this case lines $L2_{IN}$ and $L3_{IN}$. Filter capacitors CL1-L2, CL2-L3 and CL3-L1 provide normal mode (line-to-line) filtering and also provide low impedance paths between the a-c lines for returning common mode current that flows through the active filter to lines $L1_{IN}$ and $L2_{IN}$.

Figure 4:
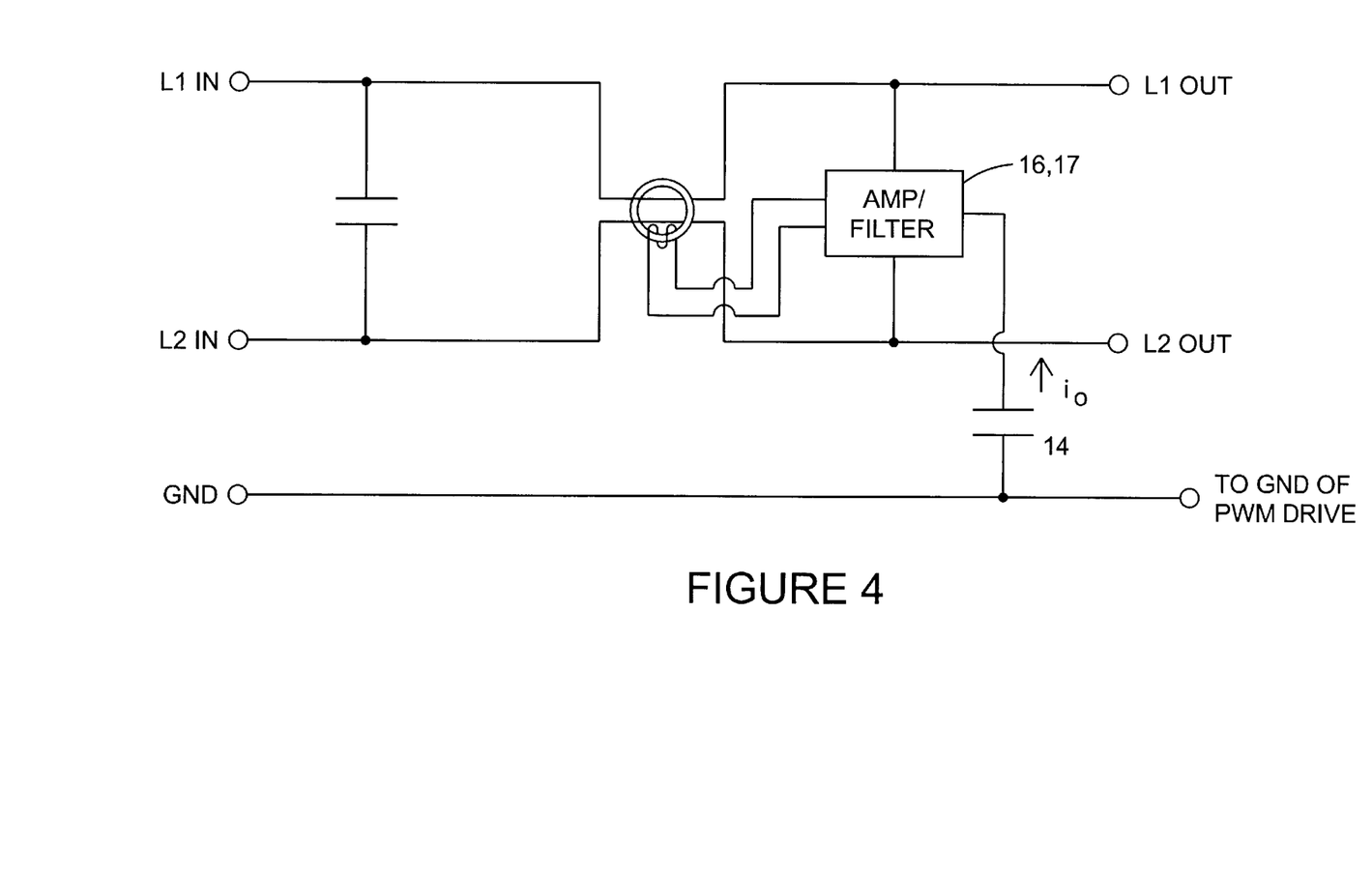
FIG. 4 shows a simplified schematic diagram of the active filter connected into the a-c line input using a feed back architecture.
Figure 5:
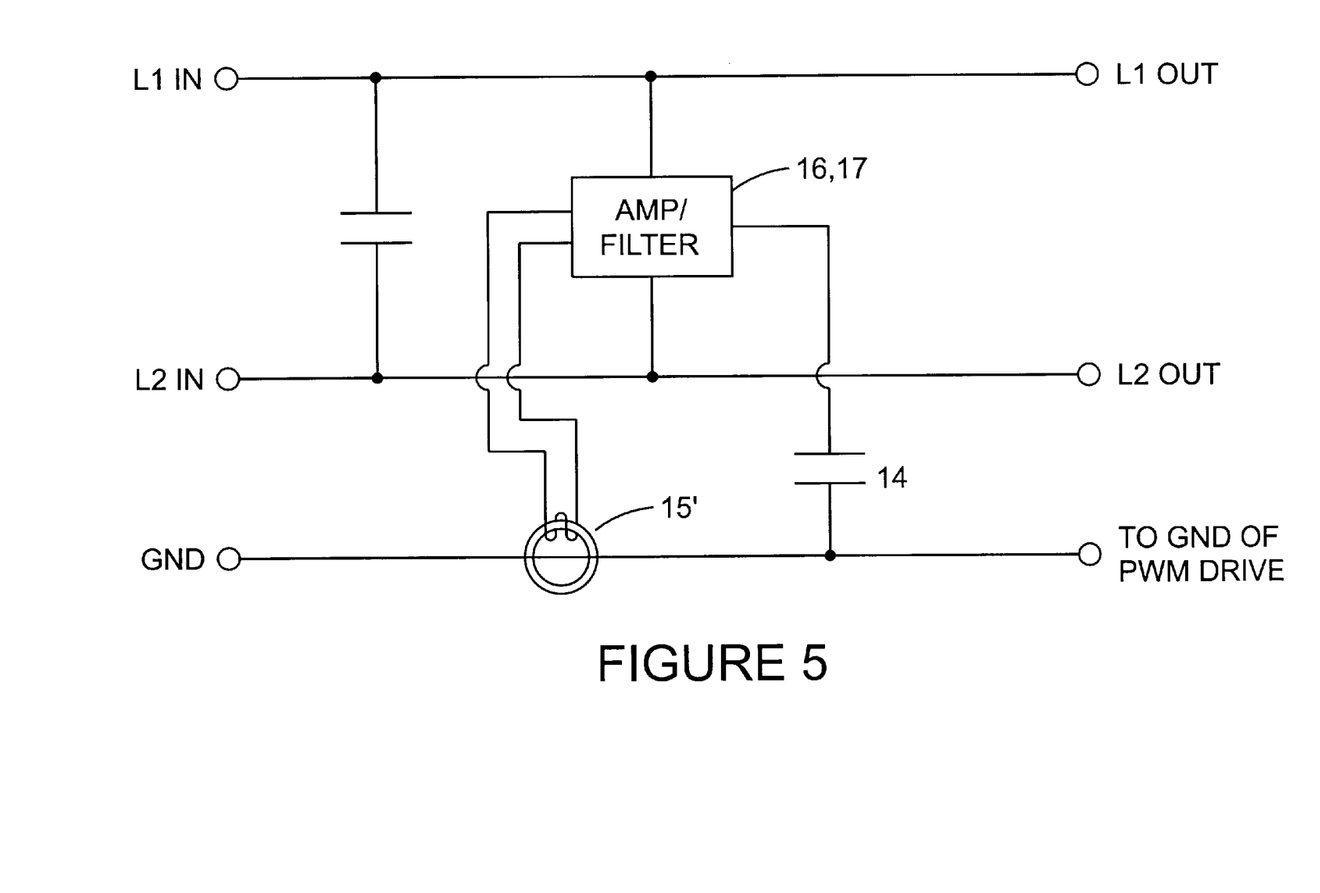
FIG. 5 shows the active filter wherein the current sensor is connected directly in the ground line in a feed back architecture.
Figure 6:
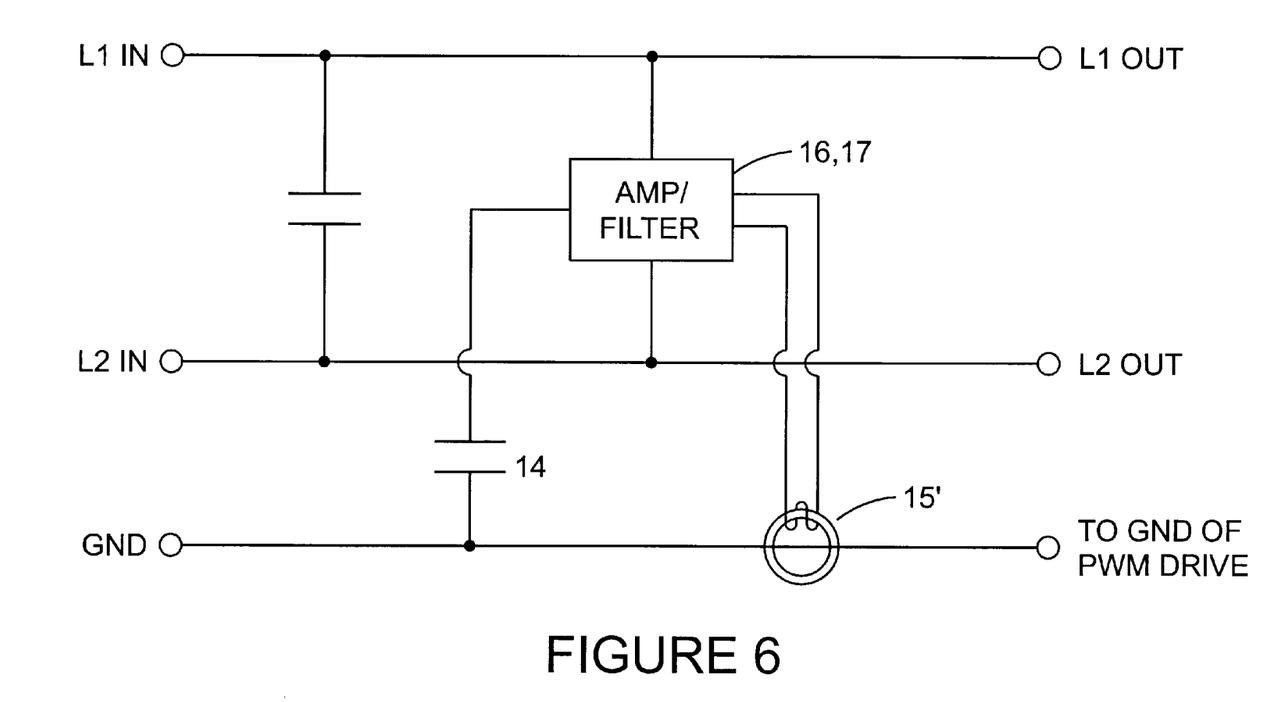
FIG. 6 shows the active filter wherein the current sensor is connected directly in the ground line in a feed forward architecture.

FIGS. 4, 5 and 6 show some other arrangements of the invention in simplified schematics for a single phase a-c input. The power supply components for the filter bus are not shown in detail, but would be provided similarly as for filter bus 18 in the circuits of FIGS. 2 and 3. Similarly, the components of the active filter circuit corresponding to amplifier 16 and current driver circuit 17 are not shown in detail.

FIG. 4 shows a feedback arrangement, in contrast to the feed forward arrangement of FIGS. 2 and 3. FIGS. 5 and 6 show arrangements wherein the current sensing transformer 15' is located in the ground line GND directly. The line GND serves as the primary of the current transformer 15'. FIG. 5 shows a feedback structure. FIG. 6 shows a feed forward structure.

Further, although in the illustrated embodiments the current sensor comprises a current transformer other current sensors can be used, e.g., resistive or magnetoresistive current sensors or any other current sensors, as can be appreciated by those of skill in the art.

Other variations are also possible. For example, in the illustrated embodiments, the d-c bus voltage for the filter is provided by a single phase half-wave rectifier circuit. Full-wave rectifier circuits may also be employed, and in the embodiment of FIG. 3, a three-phase rectifier circuit may be employed. Likewise, while the illustrated embodiments employ particular r-c circuits from which the filter bus voltage is derived, other circuit configurations, such as a single resistor and a single capacitor may be used instead.

While the present invention has been described in relation to particular embodiments thereof, many other variations and modifications and other uses will become apparent to those skilled in the art. Therefore, that the present invention should not be limited by the specific disclosure herein, but only by the appended claims.

What is claimed is:

1. An active filter for reducing common mode current in a pulse width modulating driving circuit for driving a load from a-c lines of an a-c source, wherein the driving circuit includes a rectifier having an input connectable to the a-c lines and producing a rectified output voltage connected to a d-c bus, a PWM inverter having input terminals connected to the d-c bus and having a controlled a-c output for driving the load, the active filter comprising:

a current sensor for sensing the common mode current in the driving circuit;

an active filter circuit comprising first and second transistors, each having first and second main electrodes and a control electrode, the transistors being coupled in a series circuit to drive an output node between them, the transistors being controlled such that they are alternately switched between a non-conducting state and a conducting state in a linear region by control of their control electrodes, their control electrodes being connected to an output from the current sensor, the output node between the transistors being coupled to an isolating capacitor, the isolating capacitor being coupled to a ground line coupled to the load, the two transistors providing alternate paths for current in the ground line to flow to respective ones of the a-c lines of the a-c source thereby to reduce the common mode current flowing from the a-c source by providing a circulating path for the current in the ground line, the active filter circuit being connected in the a-c lines and coupled between the a-c source and the input of the rectifier of the pulse width modulated driving circuit.

2. The active filter of claim 1 further comprising an amplifier coupled between the current sensor and the control electrodes of the two transistors.

3. The active filter of claim 1, further comprising a rectifier circuit for producing a rectified d-c bus voltage on a d-c bus for the two transistors.

4. The active filter of claim 1, further comprising at least one capacitor connecting the a-c lines of the a-c source for providing a circulating path between the a-c lines for the ground current.

5. The active filter of claim 3, further comprising at least one d-c bus voltage capacitor for providing a circulating path for the ground current between the d-c bus for the two transistors and one of the a-c lines.

6. An active filter for reducing common mode current in a pulse width modulating driving circuit for driving a load from a-c lines of an a-c source, wherein the driving circuit includes a rectifier having an input connectable to the a-c lines and producing a rectified output voltage connected to a d-c bus, a PWM inverter having input terminals connected to the d-c bus and having a controlled a-c output for driving the load, the active filter comprising:

a current sensor for sensing the common mode current in the driving circuit;

an active filter circuit comprising first and second transistors, each having first and second main electrodes and a control electrode, the transistors being coupled in a series circuit to drive an output node between them, the transistors being controlled such that they are alternately switched between a non-conducting state and a conducting state in a linear region by control of their control electrodes, their control electrodes being connected to an output from the current sensor, the output node between the transistors being coupled to an isolating capacitor, the isolating capacitor being coupled to a ground line coupled to the load, the two transistors providing alternate paths for current in the ground line to flow to respective ones of the a-c lines of the a-c source thereby to reduce the common mode current flowing from the a-c source by providing a circulating path for the current in the ground line, the active filter circuit being connected in the a-c lines and coupled between the a-c source and the input of the rectifier of the pulse width modulated driving circuit;

further comprising a rectifier circuit for producing a rectified d-c bus voltage on a d-c bus for the two transistors, wherein the d-c bus voltage is derived from at least one diode connected to at least one filter capacitor.

7. The active filter of claim 6, wherein the d-c bus for the two transistors includes at least one voltage regulator element.

8. The active filter of claim 3, wherein the first and second transistors have first electrodes coupled to the output node, the transistors each having second electrodes coupled respectively to a positive rail of the d-c bus for the two transistors and a negative rail of the d-c bus.

9. The active filter of claim 1, wherein the current sensor is coupled in the a-c lines after the active filter circuit.

10. The active filter of claim 1, wherein the current sensor is coupled in the a-c lines ahead of the active filter circuit.

11. The active filter of claim 1, wherein the current sensor is coupled to the ground line between a point where the isolating capacitor is connected to the ground line and the load.

12. The active filter of claim 1, wherein the current sensor is coupled into the ground line between a ground terminal connected to the a-c source and a point where the isolating capacitor connects to the ground line.

13. The active filter of claim 1, wherein the current sensor comprises a current transformer.

14. The active filter of claim 1, wherein the a-c source comprises a single phase a-c source.

15. The active filter of claim 1, wherein the a-c source comprises a multiple-phase a-c source.

16. The active filter of claim 1, wherein the load comprises an electric motor.

17. The active filter of claim 1, wherein the active filter circuit is coupled across the a-c lines of the a-c source and the current sensor comprises a current transformer having a primary winding coupled in series with each ones of the a-c lines and a secondary winding coupled to the active filter circuit.

18. The active filter of claim 1, wherein the active filter circuit is coupled across the a-c lines of the a-c source and the current sensor comprises a current transformer having a primary winding coupled in series with the ground line and a secondary coupled to the active filter circuit.

19. An active filter for reducing common mode current in a driving circuit for driving a load from a-c lines of an a-c source, wherein the driving circuit provides a controlled a-c output for driving the load and the load has a ground line coupled to the a-c source, the driving circuit including a rectifier having an input coupled to the a-c source and an output coupled to a d-c bus, the d-c bus being connected to an inverter circuit providing the controlled a-c output, the active filter comprising:

a current sensor for sensing the common mode current in the driving circuit;

an active filter circuit comprising a transistor current driver circuit, the current driver circuit being controlled by the current sensor such that it provides a circulating path for a ground current in the ground line, the current driver circuit being coupled to an isolating capacitor, the isolating capacitor being coupled to the ground line coupled to the load, the current driver circuit enabling the current in the ground line to flow to respective ones of the a-c lines of the a-c source thereby to reduce the ground current flowing in the ground line, the active filter circuit being connected in the a-c lines and coupled between the a-c source and the input of the rectifier of the driving circuit.

* * * * *